US008326126B2

(12) United States Patent
Godtland et al.

(10) Patent No.: US 8,326,126 B2
(45) Date of Patent: *Dec. 4, 2012

(54) AUTOMATIC SELECTION, RECORDING AND MEANINGFUL LABELING OF CLIPPED TRACKS FROM MEDIA WITHOUT AN ADVANCE SCHEDULE

(75) Inventors: Eric J. Godtland, San Francisco, CA (US); Dustin D. Sorenson, Los Angeles, CA (US)

(73) Assignee: Eric J. Godtland et al.

( * ) Notice: Subject to any disclaimer, the term of this patent is extended or adjusted under 35 U.S.C. 154(b) by 965 days.

This patent is subject to a terminal disclaimer.

(21) Appl. No.: 12/313,017

(22) Filed: Nov. 13, 2008

(65) Prior Publication Data

US 2009/0142031 A1 Jun. 4, 2009

Related U.S. Application Data (63) Continuation-in-part of application No. 10/946,330, filed on Sep. 20, 2004, now Pat. No. 7,457,517, which is a continuation-in-part of application No. 10/824,727, filed on Apr. 14, 2004, now Pat. No. 7,460,762.

(51) Int. Cl.
*G11B 27/00* (2006.01)

(52) U.S. Cl. .......... 386/278; 386/281; 386/286; 725/58; 725/80

(58) Field of Classification Search .......... 386/239, 386/241, 278, 281, 286; 455/132, 230; 725/38, 725/39, 46, 47, 55, 58, 61, 153, 80
See application file for complete search history.

(56) References Cited

U.S. PATENT DOCUMENTS

| | | | | |
|---|---|---|---|---|
| 5,199,076 | A | * | 3/1993 | Taniguchi et al. ............ 704/207 |
| 5,418,622 | A | * | 5/1995 | Takeuchi ...................... 386/241 |
| 5,721,827 | A | * | 2/1998 | Logan et al. .................. 709/217 |
| 5,726,909 | A | * | 3/1998 | Krikorian ...................... 700/94 |
| 5,732,216 | A | * | 3/1998 | Logan et al. .................. 709/203 |
| 5,892,536 | A | * | 4/1999 | Logan et al. ..................... 725/34 |
| 5,918,223 | A | * | 6/1999 | Blum et al. .......................... 1/1 |
| 5,986,692 | A | * | 11/1999 | Logan et al. ..................... 725/35 |
| 6,088,455 | A | * | 7/2000 | Logan et al. .................. 380/200 |
| 6,282,209 | B1 | * | 8/2001 | Kataoka et al. ............... 370/498 |
| 6,317,882 | B1 | * | 11/2001 | Robbins .......................... 725/34 |
| 6,320,623 | B1 | * | 11/2001 | Cavallerano et al. ......... 348/553 |
| 6,407,750 | B1 | * | 6/2002 | Gioscia et al. ................ 715/716 |
| 6,504,990 | B1 | * | 1/2003 | Abecassis ..................... 386/283 |
| 7,292,774 | B1 | * | 11/2007 | Masters et al. ................ 386/291 |
| 2003/0031248 | A1 | * | 2/2003 | Yurt et al. ................ 375/240.01 |
| 2003/0167174 | A1 | * | 9/2003 | Dagtas et al. ................. 704/275 |
| 2003/0219229 | A1 | * | 11/2003 | Gauba et al. .................... 386/83 |
| 2004/0116088 | A1 | * | 6/2004 | Ellis et al. ..................... 455/132 |
| 2004/0225519 | A1 | * | 11/2004 | Martin ............................. 705/1 |

* cited by examiner

*Primary Examiner* — Thai Tran
*Assistant Examiner* — Mishawn Dunn
(74) *Attorney, Agent, or Firm* — Lumen Patent Firm (57) ABSTRACT

Automatic selection, recording and meaningful labeling of tracks from media streams is provided. Content information which relates to tracks currently being played and/or to previously played tracks is used to guide selection of tracks to be recorded and to provide meaningful labels for recorded tracks. This content information does not provide an advance schedule of tracks to be played in the future. A segment is temporarily recorded from a selected media stream. The content information relating to tracks in the segment is compared with previous user input (i.e., track preferences) to select tracks within the segment to be recorded. For each selected track, clipping is performed to identify track start and end times. Clipped tracks are recorded onto a suitable long-term recording medium, and labeled with a meaningful label derived from the content information. Content information can be derived by automatic analysis of the media stream.

10 Claims, 4 Drawing Sheets

AUTOMATIC SELECTION, RECORDING AND MEANINGFUL LABELING OF CLIPPED TRACKS FROM MEDIA WITHOUT AN ADVANCE SCHEDULE

CROSS REFERENCE TO RELATED APPLICATIONS

This application is a continuation in part of U.S. patent application Ser. No. 10/946,330, filed Sep. 20, 2004, now U.S. Pat. No. 7,457,517 entitled "Automatic selection, recording and meaningful labeling of clipped tracks from broadcast media without an advance schedule". Application Ser. No. 10/946,330 is a continuation in part of U.S. application Ser. No. 10/824,727, filed Apr. 14, 2004, now U.S. Pat. No. 7,460,762 entitled "Automatic selection, recording and meaningful labeling of clipped tracks from broadcast media without an advance schedule".

FIELD OF THE INVENTION

This invention relates to recording of media.

BACKGROUND

In recent years, high-quality broadcast media (e.g., digital radio and digital television) and high-capacity, high-fidelity personal recording capability have become widely available. For example, a 100 GB magnetic disk drive can store high-fidelity recordings of roughly 15,000 to 50,000 music tracks, depending on resolution, and high-quality broadcast of such music tracks is becoming increasingly commonplace. As a result, the principal difficulties to be overcome in generating a library of recorded broadcasts for personal use are issues associated with creating, organizing and managing such a library. For example, if user input is required for each track (for recording, labeling and/or organizing), then generation of a large library of recorded tracks will be excessively time-consuming.

Automated selection and recording of broadcast media has been considered in the art, especially in connection with the TiVo® service offered by TiVo Inc. However, this service relies on advance schedule information and/or on special tags inserted into broadcast media streams in order to perform automatic selection and recording. For example, the system provided by TiVo Inc. typically provides advance schedule information to a user, and the user is then able to select shows for recording based on the advance schedule information. Such user selection can be manual (e.g., the user selects a particular show on a particular day for recording or triggers a recording button for immediate recording). The user selection can also be automatic (e.g., the user selects a particular type of show to be recorded, and the system automatically records all such shows found in the advance schedule when they are broadcast).

However, advance schedule information may not always be available, especially in broadcast radio. For example, an advance schedule for tracks played during a live radio call-in show is inherently impossible to provide. Moreover, some radio broadcasters are prohibited from providing an advance schedule of their programming content by current US copyright law. Furthermore, a timing discrepancy between advance schedule time and actual broadcast time is to be expected, and this discrepancy can be as much as a minute or so in current systems. Such a timing error is typically not a serious issue when recording television shows which are usually at least half an hour long, and are typically separated by lengthy commercial breaks. However, a timing error of that magnitude is unacceptable for recording music tracks which frequently have a total duration on the order of a few minutes, and are often played without intervening commercials. An advance schedule suitable for use in recording music in a hypothetical system similar to that of TiVo Inc. may be required to have a timing error of about a second or even less, which greatly increases the difficulty of providing such an advance schedule-based service.

Accordingly, it would be an advance in the art to provide automated selection and recording of broadcast media which does not require advance schedule information. It would be a further advance in the art to provide automated selection and recording of broadcast media that compensates for timing errors in content information used to make selections. It would be a further advance in the art to automatically provide meaningful labels for automatically recorded tracks.

SUMMARY

The present invention provides systems and methods for automatic selection, recording, and meaningful labeling of tracks from media streams. Content information which relates to tracks currently being played and/or to previously played tracks is used to guide selection of tracks to be recorded and to provide meaningful labels for recorded tracks. This content information does not provide an advance schedule of tracks to be played in the future. A segment is intermediate recorded from a selected media stream. The content information relating to tracks in the segment is compared with previous user input (i.e., track preferences) to select tracks within the segment to be long-term recorded. For each selected track, start and end times are determined and the track is clipped accordingly to accurately define the track. Clipped tracks are final recorded onto a suitable long-term recording medium, and labeled with a meaningful label derived from the content information. Optionally, the recorded tracks can be automatically organized according to their respective meaningful labels. Content information can be derived by automatic analysis of the media stream.

DETAILED DESCRIPTION

Figure 1:
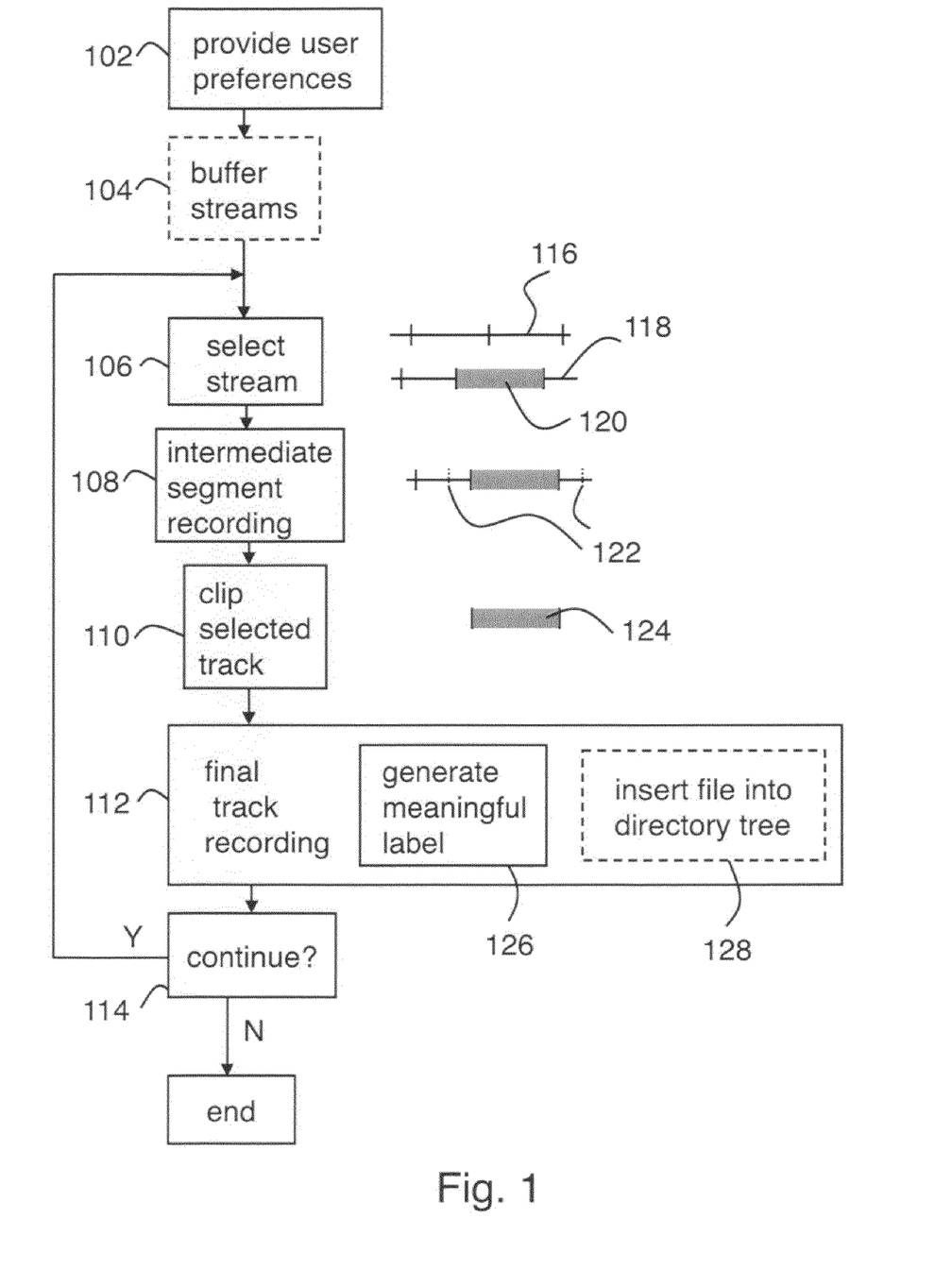
FIG. 1 is a flow diagram of an automated selection and recording method according to an embodiment of the invention.

FIG. 1 is a flow diagram of an automated selection and recording method according to an embodiment of the invention. In the example of FIG. 1, it is assumed that several broadcast media streams are available for recording, and that content information specifying the tracks currently playing on each media stream is available. Other embodiments of the invention, discussed in connection with FIG. 3a, can make use of content information relating to previously played tracks.

Throughout this description, content information can include information such as track title and/or track artist and/or track album etc. Content information can be made available either by a broadcaster or by a third party. Furthermore, content information may relate to tracks that are currently playing on broadcast media streams, or can relate to tracks that have been previously played on broadcast media streams. Content information can also be augmented with user or third-party stream descriptions. For example, a user or a third party may designate station X as "70s rock" and this designation can be included in content information for tracks recorded from station X. As used herein, content information does not include schedule information on tracks to be played in the future.

The first step of this method is to provide user preferences 102. User preferences 102 include track preferences, such as preferred artists, album titles and/or track titles. Such track preferences are used to automatically select tracks for recording in accordance with the invention. Optionally, the method can derive track preferences from user input and/or past history. For example, a list can be maintained of all tracks that have been recorded to date, and such a list allows recording of duplicates to be automatically avoided. In such cases, a user can select whether or not to prevent duplicate recording.

User preferences 102 can optionally include stream preferences, such as a station to monitor, a fixed monitoring schedule including several stations monitored at different times, and/or a monitoring schedule having at least two stations monitored simultaneously (which requires a multi-channel recording system). Alternatively, stream (or channel) selection can be based on track preferences and content information. For example, a user directive to "record anything by artist X broadcast on any channel" can be used to govern stream selection. Of course, such a directive is typically not absolute, and results will depend on stream characteristics and on the performance of the system used to implement the method. For example, if two different songs by artist X are simultaneously playing on two different streams, then a single-channel system will be able to record only one of the two songs. Stream selection can also be governed by user-supplied rules combined with historical data. For example, a user can supply a rule to de-select channels which have a high duplication rate of tracks already recorded. Conversely, a user can also supply a rule to select channels whose programming has many non-duplicate tracks of interest to the user.

The second step of the method of FIG. 1 is optional buffering 104. In this context, buffering a media stream entails receiving the media stream into a temporary storage device and outputting a buffered media stream from the temporary storage device. The buffered media stream is a faithful replica of the input media stream, except for a fixed time delay. Suitable temporary storage devices for providing such buffering of a media stream are known, and are especially easy to provide for digital media streams. In some cases, a stream may be selected after broadcast of a desired track has begun, and in such cases, buffering the media streams is preferred to enable recording of the entire desired track. This can be done by recording from the buffered media stream, and ensuring the buffer delay is longer than the delay between the start of the desired track and completion of stream selection. In some cases, the content information may be included in the same physical signal as one or more media streams, and in such cases, the incoming signal can be duplicated with one part being delayed by buffering and treated as the media stream, and the other part not being delayed and being treated as the content information. For the purposes of this description, buffering 104 provides relatively short time delays, and is preferably implemented as a RAM cache within chip-based memory.

The next step of the method of FIG. 1 is stream selection 106, as discussed above. In this example, two streams 116 and 118 are available, and a desired track 120 is identified on stream 118 based on content information and user track preferences. Thus stream 118 is selected.

The next step of the method of FIG. 1 is intermediate recording 108 of a segment of selected stream 118. Intermediate recording 108 can make use of any recording medium, such as RAM or a magnetic recording medium (e.g., a disk drive). In cases where recording 108 records to a non-volatile medium (e.g., magnetic or optical storage), the resulting recorded segment is called "intermediate" in this description (even though it is a non-volatile recording) because further processing will be performed on the recorded segment to arrive at the desired final track recordings. Segment start and end times 122 are shown on FIG. 1. Buffering as discussed above can be used to ensure the segment start time is before the start time of track 120. By monitoring the content information of stream 118, the start time of the track following track 120 on stream 118 (and thus the end time of track 120) is known. Segment recording preferably extends past this end time by a suitable time interval to ensure the segment includes all of track 120.

The next step of the method of FIG. 1 is clipping 110 of selected track 120 within the recorded segment. Clipping 110 entails automatically determining the start and end times of selected track 120. Such a determination can be made by known methods. For example, intervals of silence can be located in a segment of a media stream by a digital signal processor (DSP) (implemented in hardware and/or in software) to determine track start and end times. If background noise is present, then a DSP may use relative silence, rather than absolute silence as a guide to determine clipping points. If timing markers are available from the content information, these can be used to determine clipping points, either alone or in conjunction with the above DSP methods. Such timing markers can be provided as a real time stream relating to currently playing tracks, or as a log of start and end time of previously played tracks. Clipping 110 can be performed with a much greater degree of precision than can be expected from a system relying on advance schedule information for track start and end times, and this improved precision is a significant advantage of the invention.

The next step of the method of FIG. 1 is final recording 112 of clipped and selected track 120. Track 120 is recorded between the start and end times determined by clipping 110. Recording 112 entails generating a meaningful label 126 for the recorded track. Labels are referred to as "meaningful" only if they are derived from relevant content information. For example, a label "track00" is not a meaningful label of a recording of Beethoven's 9th symphony, while a label "Beethoven Symphony 9" is a meaningful label for such a track. Such labels can be file names, or such labeling can be implemented in an associated database relating file names to labels. For example, recorded tracks could have purely numerical file names, and a database relating numerical file-names to meaningful labels (e.g., artist, album title, song title, etc.) can be automatically constructed, maintained and updated. Optionally, recording 112 also includes organizing the recorded track according to its label (e.g., inserting the file into a directory tree 128). For example, a meaningfully labeled recording file can be inserted into a hierarchical directory structure organized by genre, artist and album title in increasing order of specificity. Final recording 112 can be to any recording medium, such as an optical recording medium, a magnetic recording medium, or a nonvolatile semiconductor memory medium. Preferably, final recording 112 is to a magnetic recording medium, such as a conventional computer hard disk drive.

Since genre information is often assumed to be obvious given the nature of the broadcast stream, genre information may be derived from user provided, third party provided or automatically generated genre descriptions for a given stream. This genre information can be combined with the content information to create a greater degree of labeling and/or organizing accuracy for each track. Such labeling and organization is largely independent of the physical nature of the recording medium. Automatic labeling of recorded tracks with meaningful content-based labels, as discussed above, is a significant advantage of the invention compared to automatic recording methods which only provide meaningless labels (e.g., numeric labels or date/time/station labels) that have no relevance to the track content. For example, an automatic recording system without automatic meaningful labeling of tracks can confront a user with a daunting and tedious task of manually labeling hundreds or even thousands of recorded tracks.

Finally, a decision 114 is made whether or not to continue monitoring and recording. If "yes", the method flow returns to a point before step 106. If "no", the method flow terminates.

Figure 2:
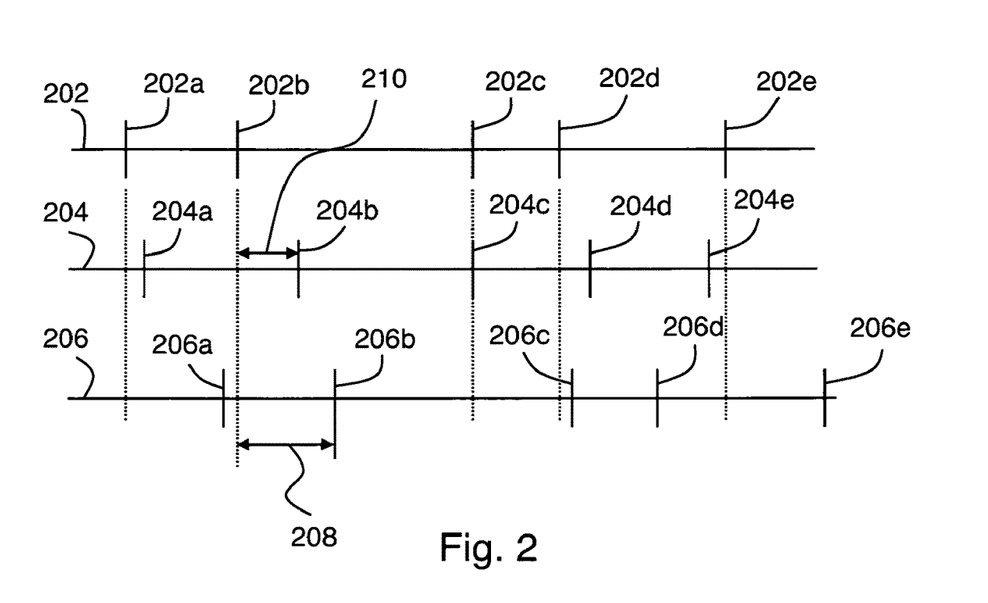
FIG. 2 shows relative timing of a stream 202, "currently playing" content information 204 for stream 202, and a buffered stream 206 obtained by time-delaying stream 202.

FIG. 2 shows relative timing of a stream 202, "currently playing" content information 204 for stream 202, and a buffered stream 206 obtained by time-delaying stream 202. In stream 202, track start times for several consecutive tracks are indicated as 202a-e. Times 204a-e are the times when content information 204 is updated to account for the playing of tracks beginning at times 202a-e respectively. As shown on FIG. 2, content information may be available immediately (e.g., 202c and 204c), or it may only become available after a track has started playing (e.g., 202a,b,d and 204a,b,d). Furthermore, this delay may vary from track to track as shown on FIG. 2. In some cases (e.g., 202e and 204e), content information may be available slightly before (e.g., less than 1 s) the corresponding track starts. In the context of FIG. 2, it is assumed that content information is available for currently playing tracks, possibly with a slight delay. Other embodiments of the invention can make use of content information on previously played tracks, and are discussed in connection with FIG. 3a.

Since stream 206 is a buffered copy of stream 202, it is the same as stream 202 except for a time delay 208. Thus 206a-e are delayed track start times corresponding to track start times 202a-e respectively. Time delay 208 is preferably larger than a maximum delay 210 between track start time and content information availability, since such buffering is sufficient to ensure recording an entire track in the presence of a slight delay in content information availability. In addition, it may require a non-negligible time Ts to switch from one stream to another. In such cases, the buffer time delay 208 is preferably greater than or equal to time delay 210 plus Ts, to enable recording of an entire track in the presence of both time delays.

Embodiments of the invention can operate in various modes. For example, either batch or triggered recording can be performed. In triggered recording, the recording of a segment from a selected media stream is responsive to an indication from content information that a track of interest is playing. In batch recording, a segment from a selected media stream is recorded without reference to the content information, and then content information for the recorded segment is used to determine if tracks of interest are present in the recorded segment. To clarify the difference between these two modes, FIGS. 3a and 3b show methods for batch and triggered recording, respectively, according to embodiments of the invention.

Figure 3A:
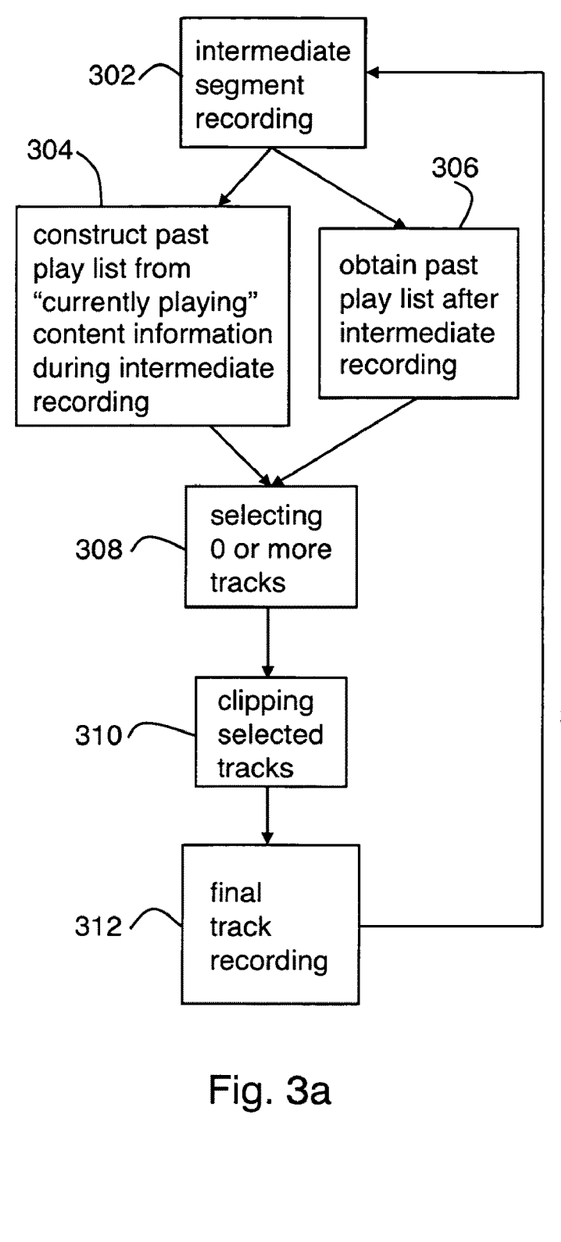
FIGS. 3a and 3b show methods for batch and triggered recording, respectively, according to embodiments of the invention.
Figure 3B:
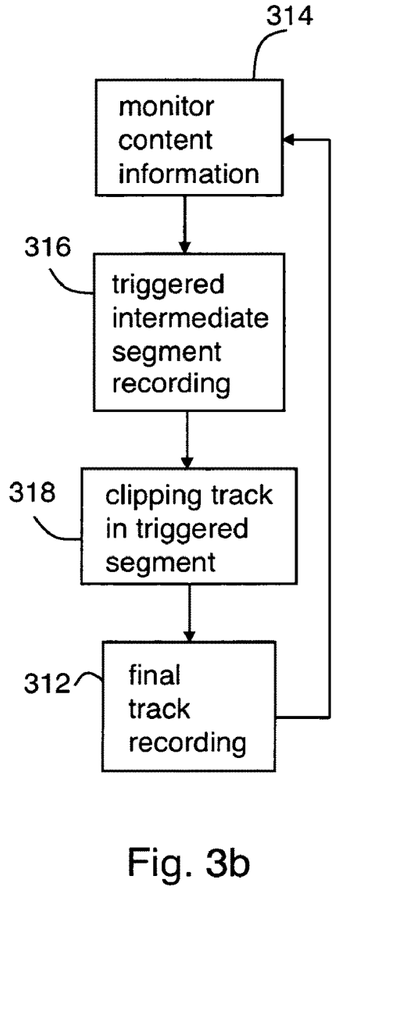

The first step in FIG. 3a (batch mode) is intermediate segment recording 302. Segment recording 302 can be to a either a volatile or a non volatile physical medium. For example, intermediate segment recording 302 can entail continuous recording of a steam for a long time (e.g., several hours) onto a magnetic disk drive, where the recorded segment is subsequently processed to locate, clip, finally record and label tracks of interest.

In this example, and throughout this description, "intermediate recording" and "final recording" are used in a broad sense. In particular, final recording can entail the transfer of information from one location to another location (e.g., in cases where intermediate recording is to a semiconductor memory, and final recording is to a magnetic disk drive). Final recording can also entail the rearrangement or relabeling of information already stored at one location. For example, if intermediate recording is to a magnetic disk drive, then final recording can entail manipulation of data already stored on the disk drive to transform recorded segments to recorded, clipped and labeled tracks.

To obtain content information for the recorded segment, a past play list can be automatically constructed 304 by monitoring "currently playing" content information during recording 302. Alternatively, a past play list can be obtained 306 after completion of recording 302. For example, the play list for a radio show may be made available (e.g., on the internet) by a broadcaster (or a third party) some time after completion of the show. Such a play list is suitable content information for a recorded segment including the radio show. Once content information for the recorded segment is available, this content information is compared with user track preferences to select 308 which tracks, if any, in the recorded segment should be recorded. Selecting 308 is preferably implemented in conventional computer software to maximize flexibility and capability and minimize cost. The selected tracks are then clipped 310 and finally recorded 312 as discussed above.

The first step in FIG. 3b (triggered mode) is monitoring 314 of content information. When a track of interest to the user is known to be playing based on the content information, triggered recording 316 of a segment of a stream including the track of interest occurs. As discussed in connection with FIGS. 1 and 2, buffering of media stream inputs is typically required to ensure recording the entire track of interest. Within the recorded segment, the track of interest is selected, based on content information and user track preferences, and then the selected track is clipped 318 and final recorded 312 as discussed above.

The batch mode of FIG. 3a is simpler than the triggered mode of FIG. 3b, mainly because buffering of media stream inputs typically is not required for batch mode recording and typically is required for triggered mode recording. However, triggered mode recording provides more flexibility to the user, and is especially advantageous for catching and recording tracks which are rarely broadcast. Thus either of these two modes may be preferred, depending on circumstances. In a multi-channel system, these two modes could be practiced simultaneously, where some channels of the system operate in batch mode and other channels operate in triggered mode.

Figure 4A:
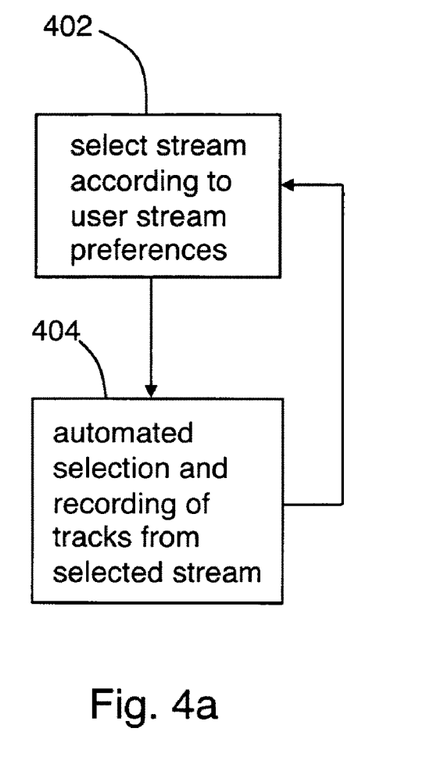
FIGS. 4a and 4b show methods for static and dynamic stream selection, respectively, according to embodiments of the invention.
Figure 4B:
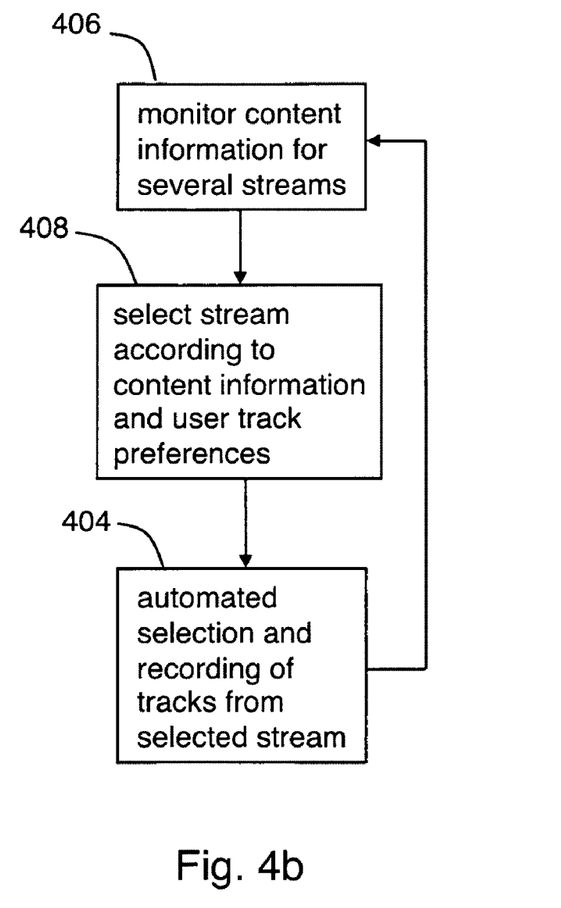

In addition to batch and triggered recording modes, the invention can be practiced with either static stream selection or dynamic stream selection. In static stream selection, streams are selected based on user stream preferences. In dynamic stream selection, streams are selected based on user track preferences and content information. In a multi-channel system, these two modes could be practiced simultaneously, where some channels of the system operate with static stream selection and other channels operate with dynamic stream selection. FIGS. 4a and 4b show static and dynamic stream selection, respectively, according to embodiments of the invention.

FIG. 4a shows a method of an embodiment of the invention having static stream selection. In step 402, a stream is selected based on user stream preferences. Such user stream preferences can specify a station, and/or a listening schedule (i.e., which stations to listen to at which times). Furthermore, in a multi-channel system, user stream preferences can specify more than one station and/or more than one listening schedule to be simultaneously monitored. Once a stream (or streams) is selected in step 402, then automated selection and recording 404 of tracks from the selected stream(s) is performed as discussed above. Static stream selection is usually practiced with batch recording, but can also be practiced with triggered recording.

FIG. 4b shows a method of an embodiment of the invention having dynamic stream selection. In step 406, content information for several streams is monitored. In step 408, at least one stream is selected based on content information and user track preferences. For example, a channel may be abandoned or avoided for playing too many tracks which have already been recorded or, conversely, the system may detect a channel on which many previously unrecorded tracks of interest are being played and change to that channel. This kind of dynamic stream selection can be practiced in connection with batch recording. Alternatively, dynamic stream selection in connection with triggered recording can be practiced. For example, if user preferences indicate that songs by artist X are to be recorded, then a stream can be dynamically selected because it is currently playing a song by artist X that has not been previously recorded. Following step 408, automated selection and recording 404 of tracks from the selected stream(s) is performed as discussed above. Dynamic stream selection is usually practiced with triggered recording, but can also be practiced with batch recording.

The preceding description relates to methods of the invention, and also provides various implementation details. Processors programmed to implement methods of the invention are also embodiments of the invention. Such embodiments can be stand-alone "set-top" boxes, or can be general purpose computers (e.g., "living room PCs") running software implementing methods of the invention. Such processors can use any combination of hardware and/or software to implement methods of the invention. The invention can also be embodied as a set of computer instructions recorded onto a computer-readable medium (e.g., an optical or magnetic disk) for implementing methods of the invention.

In the preceding description, "recording" is to be understood in broad terms. Thus recording of a segment can be to a magnetic (or optical) storage medium, or recording of a segment can entail temporary storage of the segment in a processor (or computer) buffer. In some cases, segment durations can be 15 minutes or more, which is typically long enough to include several song tracks. Such long segments are desirable for providing margin before and after track start times. For example, it is often preferred for the segment duration to exceed an estimated maximum track length by a margin of about 20 seconds.

Segment recording according to the present invention can be employed with segments having adjustable duration. For example, a segment recorded to a magnetic disk drive medium (or stored in a processor buffer) can be extended as more data is intermediate recorded from the relevant broadcast media stream. Such an adjustable segment can also be decreased in length by processing its recorded information (e.g., searching for desired tracks, and clipping and final recording the desired tracks and discarding the undesired material as discussed above). Once part of the segment has been processed, the processed fraction of the segment can be removed from the segment, thereby decreasing its duration.

Clipping of tracks according to automatically determined track start and end times can be performed in various ways. One approach, as considered above, is to clip the tracks at the estimated start and end times. However, in some cases it is preferable to provide a margin against error in clipping, by clipping before the estimated start time by a start time margin and clipping after the estimated end time by an end time margin. For example, these start and end time margins can be about 5-10 seconds. Provision of such margins leads to clipped tracks which are unlikely to be clipped incorrectly such that part of the desired track is lost during clipping.

Such clipping with margins can lead to a situation where two consecutive desired tracks are clipped in such a way that they overlap within the recorded segment. For example, if two consecutive desired tracks are separated by 5 seconds and 10 second clip margins as used, overlap of the clipped tracks will occur. Such overlapping clipping is most easily performed in "batch mode" recording as discussed above, where the recorded segment is readily available for overlapping clipping.

When clipping with margins is performed, it is preferred to provide the final recorded track in a media file format having user-adjustable start and end time information. More specifically, suppose the total duration of a clipped and final recorded track is T. Without loss of generality, this track can be regarded as extending from $0 \leq t \leq T$. Start and end times $T_1$ and $T_2$ respectively are defined in the media file (e.g., in a header) such that playback of the track begins at $t=T_1$ and ends at $t=T_2$. Provision of user adjustable start and end times in the media file format permits a user to effectively fine-tune the track clipping as needed or desired. For example, if the track starts at a time $T_a > 0$, setting the media file start time $T_1$ to a value between 0 and $T_a$ reduces the unwanted/irrelevant time at the beginning of track playback as much as desired. Similarly, unwanted/irrelevant time at the end of track playback can also be adjusted in this manner. Since the parameters $T_1$ and $T_2$ are stored as part of the media file format, such adjustment can be performed once and be effective on all subsequent playbacks of the track.

As indicated above, content information can be provided in various forms. In some cases, processing may be required to make existing forms of content information more suitable for use with the present invention. For example, content information is often provided as a video display of text (e.g., showing song title, artist name, video director, album title, record label and/or other information). Such a video display can be on the same stream being recorded (e.g., a TV station broadcasting music and continually displaying content information, or a TV station showing music videos including content information for part of the broadcast). Such a video display can also be on a stream other than a stream being recorded (e.g., content information from a "TV guide" channel). In these cases, optical character recognition (OCR) techniques can be used to extract the textual content information from the video display. Such OCR techniques are well known in the art.

For example, automatic recording of music videos can be accomplished according to the invention by use of OCR techniques to recognize or extract textual content information from video display content information. Once such content information is obtained, it can be used, as described above, to automatically record, clip and meaningfully label and organize desired music video tracks. In this manner, an organized library of recorded music videos can be automatically generated in accordance with a user's preferences.

Extraction of textual content information be performed in various ways. For example, the electronic video signal itself can be electronically processed to extract textual content information (either as text or as a 2-D pattern to be subjected to character recognition methods). An alternative method is to optically capture the video display (e.g., with a camera or other imaging device). Preferably, a digital camera is employed for this purpose. The image provided by the imaging device can then be processed to extract textual information from other parts of the image, and to recognize characters within this textual information.

The preceding examples relate to broadcast media streams where content information other than an advance schedule is available for use. However, embodiments of the invention are also applicable to clipping of any media stream, whether or not it is regarded as being broadcast. For example, automatic clipping and meaningful labeling of security surveillance video streams would be highly desirable, and such video streams are not usually thought of as being "broadcast". For this application, it will suffice to define a broadcast media stream as a media stream which can be simultaneously received at two or more separated locations. A non-broadcast media stream is a media stream which cannot be simultaneously received at two or more separated locations.

For a non-broadcast media stream, the content information required for automatic clipping and labeling can be derived by automatic analysis of the media stream itself, as described in greater detail below. Such automatic derivation of content information from the media stream itself can also be useful in connection with broadcast media streams. For brevity, it is convenient to refer to this process of deriving content information from the stream itself (broadcast or non-broadcast) as "stream content derivation".

Embodiments of the invention are applicable to automatic clipping and labeling of broadcast and non-broadcast media streams, including but not limited to: radio broadcasts, television broadcasts, web feeds, podcasting, Really Simple Syndication (RSS) feeds, audio surveillance feeds, video surveillance feeds, audio/video surveillance feeds, streaming audio clips, streaming video clips, and streaming audio/video clips. Embodiments of the invention are also applicable in cases of re-broadcasting or re-transmission of a media stream. For example, a broadcast or surveillance feed can be recorded raw (i.e., without any processing), and then clipping and labeling can be performed during play back of the raw recording. As a further example, raw video available from the internet as a streaming media clip can be processed in this manner to provide clipped and labeled tracks.

Stream content derivation can be performed in various ways. Some examples will help illustrate the possibilities. One can analyze television news streams for the name "Kevin Bacon" using existing speech analysis methods. A user-defined methodology may then be employed to create a buffer both before and after this word to clip the segment. One simple methodology is clipping a fixed time (e.g., 5 seconds) before and after the word is spoken. A more sophisticated methodology could look for pauses in speech or large changes in the video image before and after the occurrence to trigger clipping. Given enough processing power, this analysis of a media stream could be looking for thousands of markers like "Kevin Bacon" within the speech and clipping hundreds of segments accordingly on many channels at the same time.

An RSS feed or periodic Podcast from a video or audio blogging site may be monitored for occurrences as above and clipped in a similar manner. Once again, where one cannot know in advance the schedule of what will be discussed or shown, a content stream may be created from the streaming media itself through various methods of content analysis. This content stream may then provide information for intelligently clipping, naming and filing the segments.

Many previously recorded streams for which there is no published "content schedule" would be analyzable using such methods as well. For example, decades of past C-Span broadcasts archived as digital media may be "re-run" and analyzed for content markers such as "Nixon," "Carter," "Reagan," "Vietnam," "Bay of Pigs," etc. Such content markers can be regarded as being "user track preferences" in the above described methods, because the user is effectively looking for tracks which contain instances of the specified content markers. This methodology would allow these streaming media to create content information for intelligently clipping, naming and filing the segments.

Suitable methods for providing stream content derivation include voice recognition, face recognition, object recognition, and image recognition. For example, object recognition could identify instances of the appearance of a specific object (e.g., make and model of a car) in a media stream. Similarly, image recognition could identify instances of the appearance of a specific image (e.g., Mickey Mouse, written words, etc.) in a media stream. Voice recognition could identify particular spoken words and/or help identify the speaker. Face recognition could identify one or more persons appearing in an image. For example, a casino could use automatic clipping of video feeds based on face recognition to expedite identification of persons of interest, such as frequent customers, card counters, etc.

Note that stream content derivation is based on recognizing one or more content elements within the media stream, as opposed to simple pattern recognition of all or part of the media stream representation itself. For example, a method of identifying a musical track by taking a wave-form sample of the track and looking for a match of the sample in a comprehensive database would not be stream content derivation, because no content elements within the musical track (e.g., words in the lyrics) are actually recognized in this approach.

As another example, stream content derivation could include recognizing motion in a video feed. This capability can be valuable in security applications, where a video monitor may typically provide a static image, and motion in the video image can be recognized as a kind of "content" and used to cue clipping and forwarding for further analysis. For example, a video camera monitoring a commercial warehouse when the warehouse is closed would ordinarily show a static video image with no relative motion of objects in the images. Using motion recognition to cue automatic clipping enables a reviewer to efficiently concentrate on video segments that may reveal unauthorized activity. This content based approach is in sharp contrast to more conventional approaches, such as activating a video camera in response to detected motion by using a motion sensor to control the video camera.

The above detailed description is by way of example instead of limitation. Thus the invention can be practiced with various modifications to the above embodiments. For example, the above examples mainly relate to audio media, but the invention is also applicable to video and audio/video media. Also, digital media is considered in the above examples, but the invention is applicable to both analog and digital media.

The invention claimed is:

1. A method for automatically selecting, recording and labeling media tracks from a media stream, the method comprising:
   a) providing user track preferences;
   b) deriving content information relating to said media stream by automatic analysis of said media stream;
   c) intermediate recording a segment of said media stream;
   d) automatically selecting zero or more tracks within said segment in accordance with said content information and said track preferences;
   e) automatically clipping each of said selected tracks in said segment by determining track start and end times;
   f) automatically final recording each of said clipped tracks to a recording medium; and
   g) automatically labeling each of said final recorded tracks with a meaningful label derived from said content information;
   wherein said content information does not provide a schedule of tracks to be played in the future.

2. The method of claim 1, wherein said automatic analysis comprises recognizing one or more content elements of said media stream.

3. The method of claim 2, wherein said content elements comprise one or more elements selected from the group consisting of: spoken or written words, individuals, objects, and images.

4. The method of claim 1, wherein said media stream is a broadcast media stream.

5. The method of claim 1, wherein said media stream is a non-broadcast media stream.

6. A set of computer instructions recorded on and executable from a non-transient computer-readable medium for implementing a method for automatically selecting, recording and labeling media tracks from a media stream, the method comprising:
   a) providing user track preferences;
   b) deriving content information relating to said media stream by automatic analysis of said media stream;
   c) intermediate recording a segment of said media stream;
   d) automatically selecting zero or more tracks within said segment in accordance with said content information and said track preferences;
   e) automatically clipping each of said selected tracks in said segment by determining track start and end times;
   f) automatically final recording each of said clipped tracks to a recording medium; and
   g) automatically labeling each of said final recorded tracks with a meaningful label derived from said content information;
   wherein said content information does not provide a schedule of tracks to be played in the future.

7. The set of computer instructions of claim 6, wherein said automatic analysis comprises recognizing one or more content elements of said media stream.

8. The set of computer instructions of claim 7, wherein said content elements comprise one or more elements selected from the group consisting of: spoken or written words, individuals, objects, and images.

9. The set of computer instructions of claim 6, wherein said media stream is a broadcast media stream.

10. The set of computer instructions of claim 6, wherein said media stream is a non-broadcast media stream.

* * * * *